United States Patent
Rezkallah et al.

(10) Patent No.: US 9,187,346 B1
(45) Date of Patent: Nov. 17, 2015

(54) REMOVAL OF URANIUM FROM WATER

(71) Applicant: Rohm and Haas Company, Philadelphia, PA (US)

(72) Inventors: Areski Rezkallah, Lezennes (FR); Jean-Francois Ferraro, Buc (FR); Paul-Michael Pellny, Bonn (DE)

(73) Assignee: ROHM AND HAAS COMPANY, Philadelphia, PA (US)

( * ) Notice: Subject to any disclaimer, the term of this patent is extended or adjusted under 35 U.S.C. 154(b) by 0 days.

(21) Appl. No.: 14/356,987

(22) PCT Filed: Jan. 27, 2014

(86) PCT No.: PCT/US2014/013105
§ 371 (c)(1),
(2) Date: May 8, 2014

(87) PCT Pub. No.: WO2014/126699
PCT Pub. Date: Aug. 21, 2014

Related U.S. Application Data

(60) Provisional application No. 61/764,189, filed on Feb. 13, 2013.

(51) Int. Cl.
*C02F 1/42* (2006.01)
*C02F 101/00* (2006.01)

(52) U.S. Cl.
CPC .............. *C02F 1/42* (2013.01); *C02F 2001/422* (2013.01); *C02F 2101/006* (2013.01)

(58) Field of Classification Search
CPC .......... C02F 1/285; C02F 1/286; C02F 1/288; C02F 1/42; C02F 2001/422; C02F 2101/006; B01J 41/043; B01J 41/046
See application file for complete search history.

(56) References Cited

U.S. PATENT DOCUMENTS

| 4,477,377 A | 10/1984 | Izatt et al. |
| 5,274,169 A * | 12/1993 | Shirato ............... B01J 20/24 560/68 |
| 2012/0298586 A1 | 11/2012 | Grandbois et al. |

FOREIGN PATENT DOCUMENTS

IT 01249504 2/1995

OTHER PUBLICATIONS

Bibliographic data and Abstract for IT1249504B, Feb. 1995, [retrieved on Sep. 8, 2015]. Retrieved from the Internet <http://worldwide.espacenet.com/publicationDetails/biblio?DB=worldwide.espacenet.com&II=0&ND=3&adjacent=true&locale=en_EP&FT&32 D&date=19950223&CC=IT&NR=1249504B&KC=B>.*
English translation of Italian Patent 1249504 submitted by Edward W. Black on Sep. 9, 2015, ten pages.*
Signma-Aldrich, Product Specification Sheet for Gossypol from Cotton Seeds, publication date unknown, [retrieved on Sep. 9, 2015]. Retrieved from the Internet <URL:www.sigmaaldrich.com/catalog/product/sigma/g8761?lang=en&region=US>.*
Akira Nakajima et al: "Recovery of Uranium by Tannin Immobilized on Matrices which have Amino Group", Journal of Chemical Technology and Biotechnology, John Wiley & Sons LTD, United Kingdom, vol. 47, No. 1, Jan. 1, 1990, pp. 31-38.
Spiro D. Alexandratos: "Ion-Exchange Resins: A Retrospective from Industrial and Engineering Chemistry Research", Industrial & Engineering Chemistry Research, vol. 48, No. 1, Jan. 7, 2009, pp. 388-398.
Takashi Sakaushi, et al.: "Accumulation of Uranium by Immobilized Persimmon Tannin". Abstract. Jan. 1994.

* cited by examiner

*Primary Examiner* — Matthew O Savage
(74) *Attorney, Agent, or Firm* — Edward W. Black

(57) ABSTRACT

A method for removing uranium from an uranium-containing aqueous solution having a salinity of at least 0.5 ppt, comprise the step of passing the solution through a bed of anion exchange resin impregnated with polyphenol.

7 Claims, No Drawings

REMOVAL OF URANIUM FROM WATER

FIELD

The invention is directed towards the removal of uranium from aqueous solutions using anion exchange resins.

INTRODUCTION

Polyphenol naturally present in a variety of plants has the ability to remove uranium from the environment. For example, sunflowers have been used remediate contaminated soil associated with the Fukushima accident. While effective at fixing uranium, polyphenols are difficult to bind to a durable media. For example, Italian patent no. 01249504 describes treating a crosslinked polymer adsorbent with polyphenol. But as shown in the comparative examples provided below, polyphenol quickly leaches from the polymer media.

Anion exchange resins are known for use in removing uranium from water used in various potable, industrial and hydrometallurgical applications. Examples include Type 1, gel-type strong base anion resins such as DOWEX™ 1, DOWEX™ RPU and AMBERSEP™ 400 $SO_4$, all commercially available from The Dow Chemical Company. While such resins are durable and regenerable, they have lower selectively for uranium as compared with polyphenol. This lack of selectively can make anion exchange resin less competitive, particularly in applications were the uranium concentration of an aqueous solution is less than 100 μg/L.

SUMMARY

The invention includes a method for removing uranium from an uranium-containing aqueous solution having a salinity of at least 0.5 ppt, wherein the method comprises passing the solution through a bed of anion exchange resin impregnated with polyphenol. The impregnated resins used in the subject method have better selectively for uranium than traditional anion exchange resins and much more strongly bind polyphenol as compared with polymer adsorbents. A variety of additional embodiments are described.

DETAILED DESCRIPTION

The anion exchange resins applicable to the present invention are not particularly limited and include both strong base (both Type I and II) and weak base resins; however, weak base resins are preferred. Representative examples include DOWEX™ MARATHON WBA, AMBERLITE™ PWA7 and IMAC™ 24, all commercially available from The Dow Chemical Company.

The anion exchange resins used in the present invention are impregnated with polyphenol. This may be accomplished by contacting the resin within an extract of plants known to contain polyphenol, e.g. fruit juices such as cranberry, grape and blackcurrant juice. Cranberry juice is a particularly preferred source of polyphenol. Contact time is not particularly limited but is preferably long enough for the polyphenol to be retained on the resin. Techniques such as soaking or immersing the resin in fruit juice at room or elevated temperatures may be used, (e.g. 5-100° C., more preferably 20-40° C.). Alternatively, the resin may be impregnated by passing an extract containing polyphenol through a column or bed containing the anion exchange resin. Batch or continuous processes may be used. No independent chemical binders are required. The resin is preferably provided in its free base form prior to being contacted with the polyphenol.

For purposes of this description, "polyphenol" corresponds to the White-Bate-Smith-Swain-Haslam (WBSSH) definition of the term, see Haslam, E.; Cai, Y. (1994), "Plant polyphenols (vegetable tannins): Gallic acid metabolism". *Natural Product Reports* 11 (1): 41-66), i.e. compounds having: i) a molecular weight of 500-4000 Daltons, ii) at least 12 phenolic hydroxyl functional groups and iii) at from 5 to 7 arene groups per 1000 Daltons. In terms of functional and operational classification, polyphenols can be divided into hydrolyzable tannins (gallic acid esters of glucose and other sugars or cyclitols) and phenylpropanoids, such as lignins, flavonoids, and condensed tannins.

As used herein, the term "uranium" refers to water soluble multivalent anionic complexes including carbonates, chlorides and sulfates. With respect to uranium, the term "water soluble" means a compound or complex having a Ksp For purposes of this description, "salinity" is expressed in per mile (party per thousand (ppt)), which is approximately grams of salt per kilogram of solution and which is commonly represented as a percent (%). In a preferred embodiment, the salinity of the subject aqueous solution is at least: 0.5 ppt, 5 ppt, 30 ppt and in some embodiments at least 50 ppt. In other embodiments, the salinity is from 0.5 to 50 ppt.

EXAMPLES

Example 1

A series of experiments were conducted on two commercially available resins* impregnated with polyphenol. Impregnation was accomplished by soaking a 50 ml sample of each resin in a liter of several different fruit juices for approximately 4 hours at 25° C. The resins were then removed from the juice and washed with water.

The adsorption strength of the samples was determined by soaking each sample in an equivalent quantity of water for approximately 8 hours. The TOC (total organic carbon) of the water was measured before and after the soaking step. No appreciable change in TOC values were measured—indicating that the polyphenol was strongly retained by both types of resins.

The test was repeated with fresh samples but a saline solution (50 ppt NaCl solution was substituted for the water in the previous test. As with the previous test, no appreciable change in TOC values were measured for the weak base anion resin samples; however, the TOC value of the adsorbent resin sample increased significantly—indicating that the polyphenol was not strongly retained. Details regarding the samples and a summary of the results are provided in Table 1.

TABLE 1

| Sample | Source of Polyphenol | Resin | TOC (water soak) | TOC (saline soak) |
|---|---|---|---|---|
| 1 | Cranberry juice | Weak base anion | No change | No change |
| 2 | Cranberry juice | Absorbent | No change | Increase |
| 3 | Blackcurrant juice | Weak base anion | No change | No change |
| 4 | Grape juice | Weak base anion | No change | No change |

*The resins included: i) an absorbent resin having a crosslinked polystyrene matrix (Amberlite™ FPX66), and ii) a weak base anion exchange resin in free base form having a crosslinked polystyrene matrix along with alkylamine functional groups (IMAC™ 24). Both resins were obtained from The Dow Chemical Company.

Example 2

Four 1.5 mL samples of a weak base anion exchange resin (IMAC™ 24) where soaked in a 125 mL uranium solution (110 ppm) for 8 hours. The resulting supernatant for each sample was analyzed by inductively coupled plasma. The details of the resins and the results of the analysis are summarized in Table 2. As reflected in the data, weak base anion exchange resins impregnated with various sources of polyphenol removed significantly more uranium from the solution as compared with a control.

TABLE 2

| Sample No. | Source of polyphenol | Uranium Conc. in Supernatant (ppm) |
|---|---|---|
| 5 (control) | N/A | 41 |
| 6 | Cranberry juice | <0.5 |
| 7 | Grape juice | 4 |
| 8 | Blackcurrant juice | 16 |

The invention claimed is:

1. A method for removing uranium from an uranium-containing aqueous solution having a salinity of at least 0.5 ppt, wherein the method comprises passing the solution through a bed of anion exchange resin impregnated with polyphenol.

2. The method of claim 1 wherein the polyphenol is derived from fruit juice.

3. The method of claim 1 wherein the polyphenol is derived from cranberry juice.

4. The method of claim 1 wherein the anion exchange resin comprises a weak base exchange resin.

5. The method of claim 1 wherein the aqueous solution has a salinity of at least 5 ppt.

6. The method of claim 1 wherein the aqueous solution has a salinity of at least 50 ppt.

7. The method of claim 1 wherein the solution after treatment has less than 5 ug/1 of uranium.

* * * * *